May 12, 1959  A. MAZEIKA  2,886,807
DRIVEWAY SIGNALS
Filed July 14, 1958
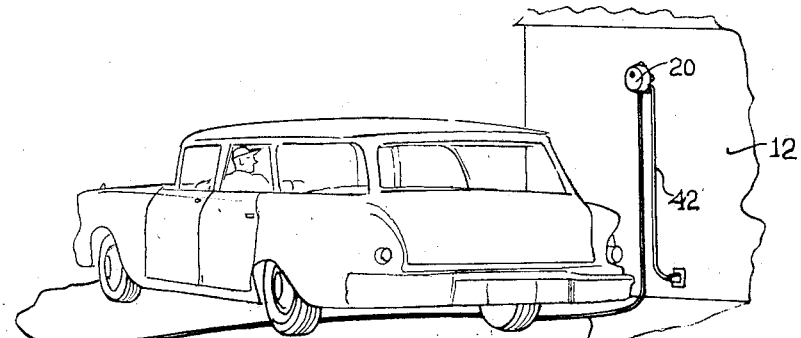
*Fig. 1.*
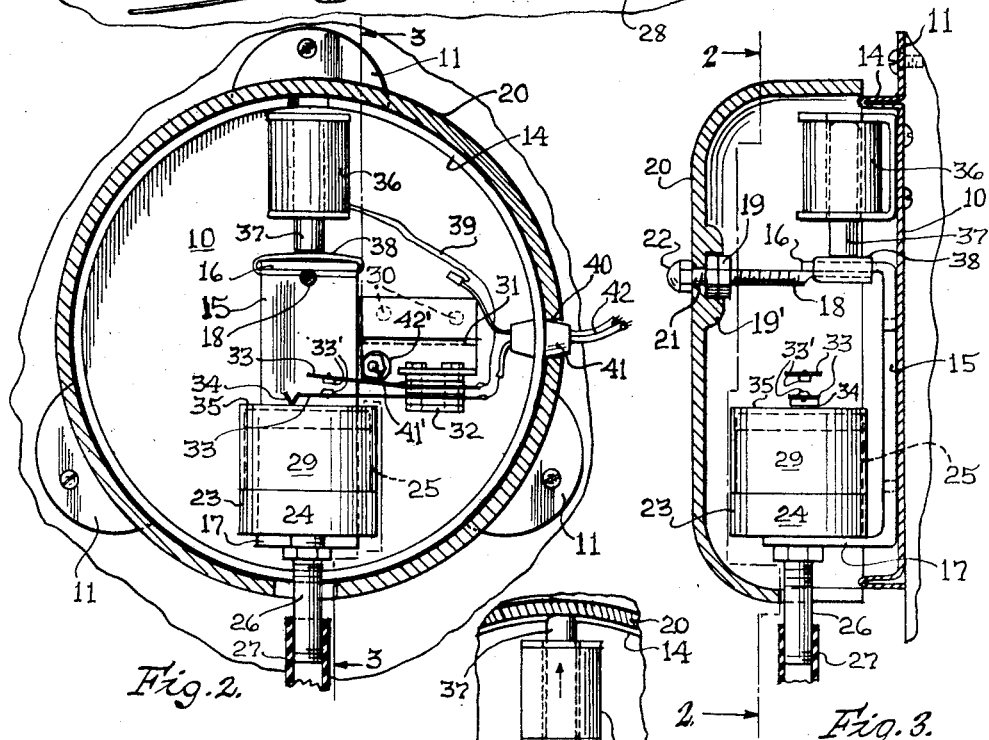
*Fig. 2.*   *Fig. 3.*
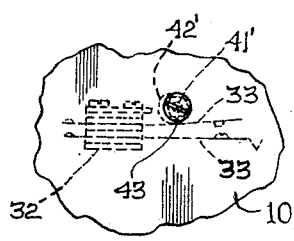
*Fig. 5.*
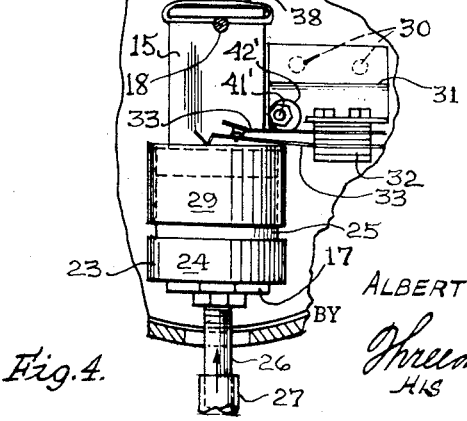
*Fig. 4.*
INVENTOR.
ALBERT MAZEIKA
BY
Threedy & Threedy
HIS ATTORNEYS.

2,886,807

DRIVEWAY SIGNALS

Albert Mazeika, Chicago, Ill., assignor to Milton Manufacturing Co., Inc., Chicago, Ill., a corporation of Illinois Application July 14, 1958, Serial No. 748,255

10 Claims. (Cl. 340—396)

This invention relates to driveway signals especially designed for use at gas stations, entrances to garages, or other places where it is desirable that a signal be sounded by the movement of an automobile or any wheeled vehicle to summon an attendant.

An object of the invention is to provide in such a signal an arrangement which upon the slightest weight imposed upon a hose extending across the path of an automobile or other vehicle, will strike a gong to give the aforesaid signal and thus advise the attendant of the presence of such vehicle.

A still further and important object of the invention is to provide a driveway signal of the character hereinafter described wherein the signal becomes effective upon the slightest weight imposed upon a hose irrespective of the length of the hose or at what point such weight is imposed.

Another object of the invention is the novel arrangement for adjusting the blades of a control switch whereby the proper space between the blades may be obtained, necessary for effecting operation of the device.

Another object of this invention is to provide a device of the character herein described in which all the parts are contained within a single enclosure including a gong and from which enclosure the hose extends.

Other objects will appear hereinafter.

The invention consists in the novel combination and arrangement of parts to be hereinafter described and claimed.

The invention will be best understood by reference to the accompanying drawings showing the preferred form of construction and in which:

Fig. 1 is a perspective view of the invention illustrated in association with a service station;

Fig. 2 is a sectional detail view taken substantially on line 2—2 of Fig. 3;

Fig. 3 is a sectional detail view taken substantially on line 3—3 of Fig. 2;

Fig. 4 is a fragmentary sectional detail view similar to Fig. 2, but showing certain parts thereof in different positions;

Fig. 5 is a fragmentary rear view of a wall plate embodying the invention.

It is contemplated that the several objects of my invention be accomplished by the preferred form of construction shown in the accompanying drawings. In this connection a wall plate is indicated at 10. This wall plate has mounting ears 11 by means of which the plate is secured to a wall 12 through the medium of screws 13. The wall plate provides an annular rim 14.

Secured to one face of the plate 10 is a bracket 15. This bracket 15 has a horizontally extending portion 16 at its upper end portion and a horizontally extending portion 17 at its lower end portion. Secured to and extending from the portion 16 is a stud shaft or bracket arm 18. When a stud shaft is used there is threaded thereon lock nuts 19 adapted to seat in a recess provided in the boss 19' provided by the gong 20 hereinafter referred to. In the case of a bracket in lieu of a stud shaft the gong may be secured to the end thereof in any suitable manner.

Such gong 20 is provided with an opening 21 through which the outer end portion of the shaft 18 extends. The gong is spaced from the plate 10 and is secured to the stud shaft 18 by a nut 22 threaded thereon.

Mounted on the lower horizontal portion 17 of the bracket 15 is an expansible cylinder 23 formed of non-conductive material. This cylinder 23 comprises a base section 24 having a reduced collar 25. Communicating with the cylinder 23 is a nipple 26 to which the end 27 of a length of hose 28 is attached. The hose 28 may be of any flexible or compressible material and of any length.

The cylinder also comprises a cap 29 which is telescopically positioned with respect to the collar 25. The material from which the cylinder is made is of relatively light weight so that the minimum degree of energy is required to expand the base and cap 24 and 29, respectively.

Carried by and supported as at 30 from the wall 10 is a bracket 31 which supports a switch 32. This switch 32 comprises oppositely disposed switch blades 33 normally in open position with respect to each other. The lower of the switch blades is provided with a V-shaped seat 34 which rests upon the top wall 35 of the cap 29.

Carried by the wall 10 above the horizontal portion 16 is an electromagnetic coil 36 which includes a vertically movable plunger 37 adapted when projected upwardly to strike the gong 20. When the coil 36 is deenergized, the plunger rests upon an insulated seat 38 carried by the horizontal portion 16 of the bracket 15.

An electric power circuit 39 is provided and includes the coil 36 and the switch 32. A suitable opening in the flange 14 is provided as at 40 for the positioning of an insulator sleeve 41 through which the electric wires 42 of the circuit are passed into the housing.

Carried by the plate 15 is a shaft 41'. On this shaft 41' is a cam 42' which normally bears against the uppermost switch blade of the switch blades 33.

Formed as a part of this shaft and located at the back of the wall plate 10 is an enlarged screw head 43 by means of which the shaft 41' may be adjusted to bear the cam on the uppermost blade of the switch blades 33 to vary the distance between the contacts 33' of such blades.

The arrangement of the parts of my improved signal is such that the least weight imposed thereupon the hose will effect expansion of the cylinder 23 to move the cap 29 upwardly to close the switch 32, thereby to energize the coil 36 to effect upward projection of the solenoid against the gong 20, thereby to sound a signal to summon the attendant.

It will be apparent that my improved driveway signal comprising relatively few parts, can be manufactured at an economical cost and is effective as a signal for the purpose intended.

The provision of the cam 42 permits adjusting the switch blades 33 to prevent burning or sticking of the same. By adjusting the cam 42', a proper distance between the blades 33 may be obtained necessary for operation of the signal upon the slightest movement of the cap 29, relative to the base 24.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A driveway signal comprising a housing providing a gong, an expansible member in the housing having means for connection with a hose and expansible when a weight is imposed upon said hose to expand the air therein, a switch comprising opposite blade members normally open and closable by engagement with and expansion of said member, said switch positioned in the housing with the blade members thereof extending substantially at right angles with respect to the direction of expansion of said expansible member, an electromagnetic coil in said housing spaced from and above said expansible member and having a solenoid extending at right angles with respect to an adjacent wall of the housing and adapted to be projected thereagainst when said electromagnetic coil is energized by the closing of said switch upon expansion of said expansible member, and an electric power circuit including said switch and said electromagnetic coil.

2. A driveway signal comprising a housing providing a gong, an expansible member in the housing having means for connection with a hose and expansible when a weight is imposed upon said hose to expand the air therein, a switch comprising opposite blade members normally open and closable by engagement with and expansion of said member, said switch positioned in the housing with the blade members thereof extending substantially at right angles with respect to the direction of expansion of said expansible member, an electromagnetic coil in said housing spaced from and above said expansible member and having a solenoid extending at right angles with respect to an adjacent wall of the housing and adapted to be projected thereagainst when said electromagnetic coil is energized by the closing of said switch upon expansion of said expansible member, and an electric power circuit including said switch and said electromagnetic coil, and means for varying the distance between said switch blades.

3. A driveway signal comprising a housing providing a gong, an expansible member in the housing having means for connection with a hose and expansible when a weight is imposed upon said hose to expand the air therein, a switch comprising opposite blade members normally open and closable by engagement with and expansion of said member, said switch positioned in the housing with the blade members thereof extending substantially at right angles with respect to the direction of expansion of said expansible member, an electromagnetic coil in said housing spaced from and above said expansible member and having a solenoid extending at right angles with respect to an adjacent wall of the housing and adapted to be projected thereagainst when said electromagnetic coil is energized by the closing of said switch upon expansion of said expansible member and said electromagnetic coil, cam means for varying the distance between said switch blades, and means exterior of said housing for adjusting said cam means relative to said switch blades to vary the distance therebetween.

4. A driveway signal comprising a wall plate, mounting means extending laterally from said plate, a gong mounted on said mounting means in spaced relation to the plate and providing together with the plate a housing, an expansible member in said housing having means for connection with a hose and expansible when a weight is imposed upon said hose to expand the air therein, a switch comprising opposite blade members normally open and closable by engagement with and expansion of said member, said switch positioned in the housing with the blade members thereof extending substantially at right angles with respect to the direction of expansion of said expansible member, an electromagnetic coil in said housing spaced from and above said expansible member and having a solenoid extending at right angles with respect to an adjacent wall of the housing and adapted to be projected thereagainst when said electromagnetic coil is energized by the closing of said switch upon expansion of said expansible member, and an electric power circuit including said switch and said electromagnetic coil.

5. A driveway signal comprising a wall plate, a mounting means extending laterally from said plate, a gong mounted on said mounting means in spaced relation to the plate and providing together with the plate a housing, an expansible member in the housing having means for connection with a hose and expansible when a weight is imposed upon said hose to expand the air therein, a switch comprising opposite blade members normally open and closable by engagement with and expansion of said member, said switch positioned in the housing with the blade members thereof extending substantially at right angles with respect to the direction of expansion of said expansible member, an electromagnetic coil in said housing spaced from and above said expansible member and having a solenoid extending at right angles with respect to an adjacent wall of the housing and adapted to be projected thereagainst when said electromagnetic coil is energized by the closing of said switch upon expansion of said expansible member, and an electric power circuit including said switch and said electromagnetic coil, and means for varying the distance between said switch blades.

6. A driveway signal comprising a wall plate, mounting means extending laterally from said plate, a gong mounted on said mounting means in spaced relation to the plate and providing together with the plate a housing, an expansible member in the housing having means for connection with a hose and expansible when a weight is imposed upon said hose to expand the air therein, a switch comprising opposite blade members normally open and closable by engagement with and expansion of said member, said switch positioned in the housing with the blade members thereof extending substantially at right angles with respect to the direction of expansion of said expansible member, an electromagnetic coil in said housing spaced from and above said expansible member and having a solenoid extending at right angles with respect to an adjacent wall of the housing and adapted to be projected thereagainst when said electromagnetic coil is energized by the closing of said switch upon expansion of said expansible member, an electric power circuit including said switch and said electromagnetic coil, cam means for varying the distance between said switch blades, and means exterior of said housing for adjusting said cam means relative to said switch blades to vary the distance therebetween.

7. A driveway signal comprising a housing providing a gong, an expansible member in the housing having means for connection with a hose and expansible when a weight is imposed upon said hose to expand the air therein, said expansible member comprising a base member and a cap telescopically positioned upon said base member, a switch comprising opposite blade members normally open and closable by engagement with and expansion of said member, said switch positioned in the housing with the blade members therof extending substantially at right angles with respect to the direction of expansion of said expansible member, an electromagnetic coil in said housing spaced from and above said expansible member and having a solenoid extending at right angles with respect to an adjacent wall of the housing and adapted to be projected thereagainst when said electromagnetic coil is energized by the closing of said switch upon expansion of said expansible member, and an electric power circuit including said switch and said electromagnetic coil.

8. A driveway signal comprising a housing providing a gong, an expansible member in the housing having means for connection with a hose and expansible when a weight is imposed upon said hose to expand the air therein, said expansible member comprising a base member and a cap telescopically positioned upon said base member, a switch comprising opposite blade members normally open and closable by engagement with and expansion of said member, said switch positioned in the housing with the blade members thereof extending substantially at right angles with respect to the direction of expansion of said expansible member, an electromagnetic coil in said housing spaced from and above said expansible member and having a solenoid extending at right angles with respect to an adjacent wall of the housing and adapted to be projected thereagainst when said electromagnetic coil is energized by the closing of said switch upon expansion of said expansible member, an electric power circuit including said switch and said electromagnetic coil, and means for varying the distance between said switch blades.

9. A driveway signal comprising a wall plate, a bracket connected to said plate, a stud shaft extending laterally from said bracket, a gong mounted on said stud shaft and spaced from and in facial relation with respect to said plate and providing together with said plate a housing, said bracket having a horizontally extending portion, a base member mounted on said horizontal portion, a cap telescopically arranged with respect to the base member, a nipple extending exteriorly of the housing and having communication with said base member, a switch supported by said wall plate and comprising switch blades extending substantially at right angles with respect to said cap with one of said blades in engagement with the top wall of the cap, said switch blades being normally in open relation with respect to each other, an electromagnetic coil carried by said wall plate above said bracket and including a solenoid projectable against said gong when said coil is energized, said bracket having at its upper end portion a horizontally extending arm providing a seat for said solenoid when said coil is deenergized, and an electric circuit including said switch blades and said coil.

10. A driveway signal comprising a wall plate, a bracket connected to said plate, a stud shaft extending laterally from said bracket, a gong mounted on said stud shaft and spaced from and in facial relation with respect to said plate and providing together with said plate a housing, said bracket having a horizontally extending portion, a base member mounted on said horizontal portion, a cap telescopically arranged with respect to the base member, a nipple extending exteriorly of the housing and having communication with said base member, a switch supported by said wall plate and comprising switch blades extending substantially at right angles with respect to said cap with one of said blades in engagement with the top wall of the cap, said switch blades being normally in open relation with respect to each other, an electromagnetic coil carried by said wall plate above said bracket and including a solenoid projectable against said gong when said coil is energized, said bracket having at its upper end portion a horizontally extending arm providing a seat for said solenoid when said coil is deenergized, an electric circuit including said switch blades and said coil, a shaft carried by said plate, a cam on said shaft for engagement with respect to one of said switch blades for adjusting said one switch blade relative to the other of said switch blades, said shaft having means exterior of the housing to facilitate adjustment thereof.

No references cited.